Oct. 18, 1932.   L. A. GRIMES   1,883,720
SLOW LEAK DEVICE
Filed Aug. 14, 1930
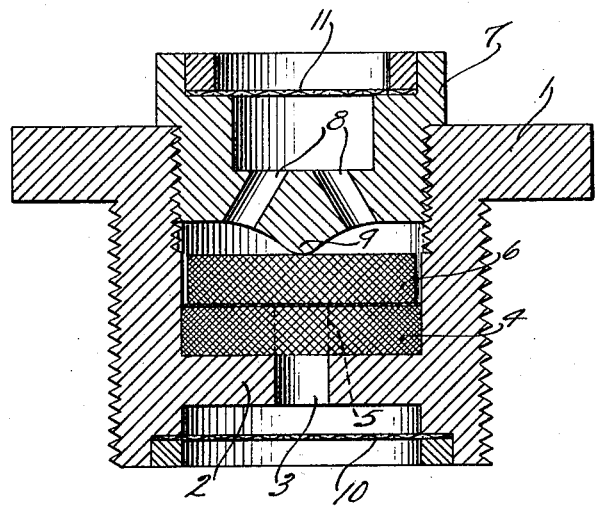
INVENTOR
Lester A. Grimes.
BY
Bartlett, Eyre, Scott & Keel
ATTORNEYS Patented Oct. 18, 1932  1,883,720

UNITED STATES PATENT OFFICE

LESTER A. GRIMES, OF MONTCLAIR, NEW JERSEY, ASSIGNOR TO GRIMES SPRINKLER COMPANY, INC., OF NEWARK, NEW JERSEY, A CORPORATION OF NEW JERSEY

SLOW LEAK DEVICE

Application filed August 14, 1930. Serial No. 475,319.

The present invention relates to a slow leak or breathing device for use in apparatus of the type which is responsive to rate of change of fluid pressure, such as accelerators or exhausters for dry pipe sprinkler systems, pneumatic or thermostatic apparatus, or the like.

Slow leak devices heretofore employed, including pin hole orifices or restricted passages become readily clogged with dust or other foreign matter with consequent false operation of the apparatus in which they are employed. The device of the present invention avoids this disadvantage of the usual leak devices by the provision of roughened surfaces in place of the usual pin hole or similar constricted opening, leakage occurring between the surfaces over a considerable area.

For a better understanding of the invention reference may be had to the accompanying drawing in which is illustrated a sectional view of the preferred embodiment of the invention.

Referring to the drawing, a cylindrical member 1 has a partition 2 across the bore thereof within which is a relatively large passage 3. Cemented or soldered in any suitable manner to one side of the partition 2 is a disk 4 with a central passage 5 therethrough in alinement with the passage 3. A second disk 6, of a diameter sufficiently smaller than the bore of member 1 to permit ready insertion or removal thereof, and to permit relatively unrestricted flow of fluid about the periphery of the disk, is held in engagement with the disk 4 by means of an externally threaded member 7 adapted to be screwed into one end of the cylindrical member 1. Member 7 is provided with a plurality of passages 8 therethrough and with a projecting portion 9 adapted to engage the disk 6 when the parts are assembled. Wire gauze or other filtering material, indicated at 10 and 11, covers the entrance to passages 3 and 8. Member 1, as shown, is threaded over a part of its external surface and has a head formed at one end thereof. It will be understood that the device, when in use, is screwed into the wall of a chamber or of a pipe for the purpose of permitting normal equalization through the device of the pressures at either side thereof while preventing such pressure equalization during rapid changes of the pressure at either side thereof.

To provide a restricted passage through the device 1 which will not become readily clogged with dust, the contacting surfaces of disks 4 and 6 are made rough by means of an abrasive or grinding material to permit filtration of air or other fluid therebetween. A fluid stream entering the device 1 through the passages 3 and 5 thus spreads radially from the passage 5 between the roughened surfaces of disks 4 and 6 and then passes around the periphery of disk 6 and out through the passages 8 and filter 11.

For a given area of surface of disk 6, the preferred degree of roughness of the contacting surfaces of disks 4 and 6 will depend upon the use to which the device is to be put; that is upon the normal rate of leakage desired.

The greater the diameter of the disks, the more rough or coarse should be the surfaces thereof, for a given leakage.

Where the slow leak device is to be utilized in valve accelerating devices for dry pipe sprinkler systems to permit pressure equalization through the leak during slow pressure changes but to prevent such equalization when the pressure at either side of the leak device changes at a rapid rate, the surfaces of disks 4 and 6 are preferably roughened to about the degree of ground glass for a diameter of disk 6 of about nine-sixteenths inch. For this purpose a grinding composition of the type used in grinding valves and having a medium coarseness is suitable.

Preferably both surfaces of disk 6 are roughened to the same degree to insure that the same leakage is obtained irrespective of the manner in which the disk is inserted in the device during assembly. If desired, however, the two surfaces of disk 6 could be ground to different degrees of roughness to permit the same device to be used under conditions requiring different degrees of leakage, as might occur, for example, upon a change in the consistency of the fluid whose leakage is to be controlled.

Disks 4 and 6 should be constructed of non-corrosive material to insure permanence of the roughened surfaces thereof. Glass or Monel metal disks are particularly suitable for use.

For clarity, and to illustrate a practical embodiment of the invention and one suitable for use in such mechanisms as valve accelerating of exhausting devices, a specific construction has been described and illustrated. The invention, however, is concerned primarily with the substitution for a pin hole or constricted orifice of contacting roughened surfaces whereby leakage occurs over an extended area and the disadvantages inherent with the pin hole construction are eliminated. Moreover the use of roughened contacting surfaces in slow leak devices permits of a construction which may be readily disassembled for cleaning, inspection or repair.

From a manufacturing standpoint it is convenient to provide the disk 4 as an element made separately from the device 1 and cemented to partition 2. Inasmuch as disk 4 serves only to provide a roughened surface for contact with that of disk 6 it need not be removable and could, in fact, be integral with, or part of, structure 1.

The following is claimed:

1. A slow leak device comprising in combination a member having a passage therethrough, a pair of elements located in said passage, one of said elements having an aperture therethrough and being so disposed in said passage as to prevent leakage of fluid there passed except through said aperture and the other of said elements being non-apertured and having dimensions substantially less than that of the cross-section of the passage through said member, and means for holding said elements in contact; the surfaces of said elements being roughened where in contact whereby fluid passing through said aperture may leak between the contacting roughened surfaces of said elements.

2. A slow leak device comprising in combination a member having a cylindrical passage therethrough and an apertured partition across said passage, a disk cemented to said partition and having an aperture in alinement with that of said partition, a second disk, and an apertured plug adapted to be screwed into said member to hold said second disk in contact with said first mentioned disk, said disks being of non-corrosive material and having their contacting surfaces roughened to permit leakage therebetween.

3. The combination according to claim 2 wherein said member is provided with a filter across the passage therethrough.

In testimony whereof, I have signed my name to this specification.

LESTER A. GRIMES.